June 21, 1955
F. H. GROVEN
2,711,349
HUB CAP WITH SPOKES
Filed Feb. 12, 1953
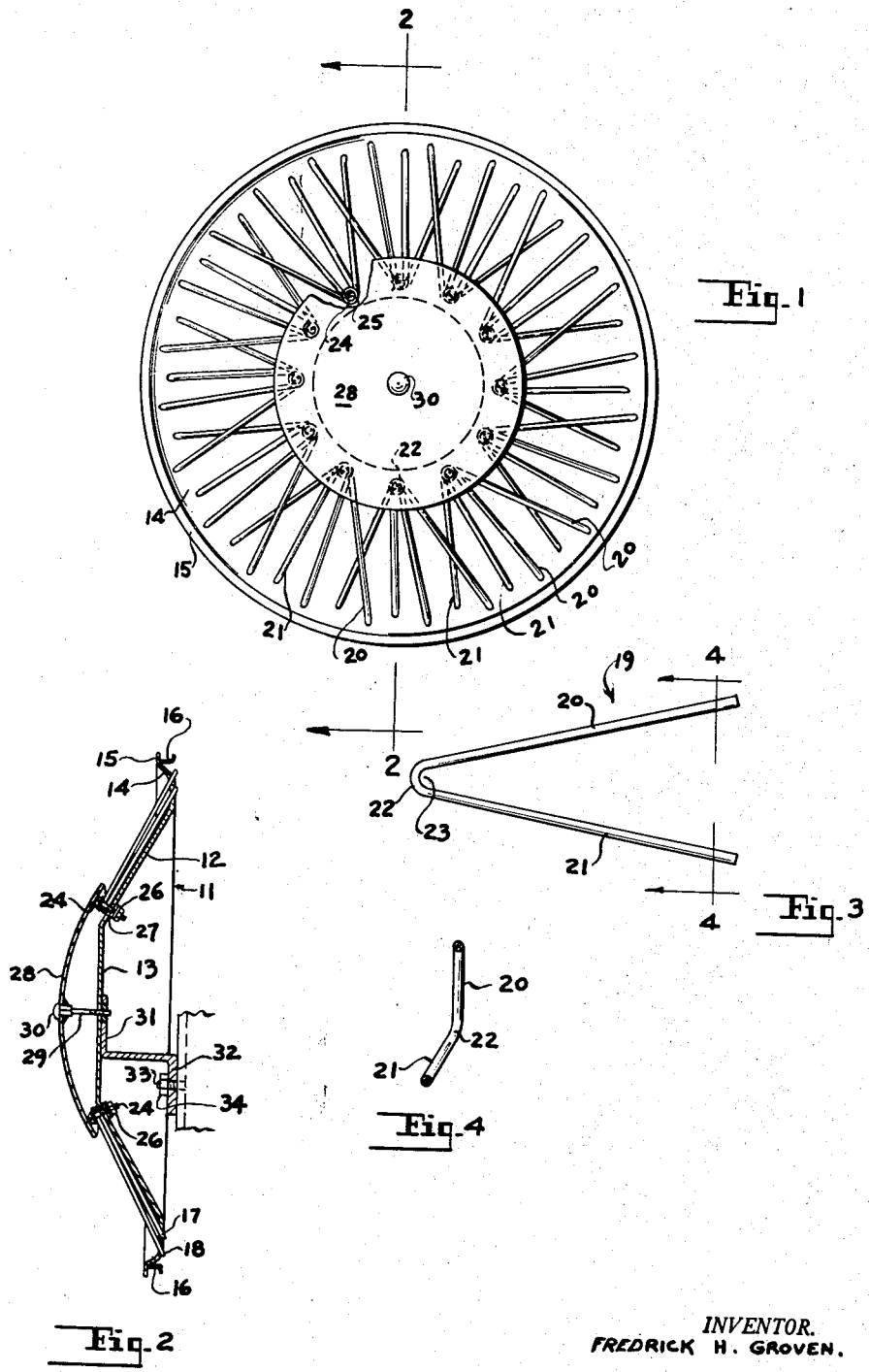
INVENTOR.
FREDRICK H. GROVEN.
BY
Robert A. Sloman
ATTORNEY.

United States Patent Office 2,711,349
Patented June 21, 1955

2,711,349

HUB CAP WITH SPOKES

Fredrick H. Groven, Clarkston, Mich.

Application February 12, 1953, Serial No. 336,549

6 Claims. (Cl. 301—37)

This invention relates to a wheel hub cap, and more particularly to a novel hub cap construction including spoke elements.

It is the object of the present invention to provide a hub cap with simulated U-shaped spoke elements suitably secured thereon.

It is the further object of this invention to provide a central mounting for each spoke element with the ends of said spoke elements positioned in a free floating relationship with respect to the mounting plate.

It is the still further object of this invention to provide a simplified method of assembling a series of spoke elements upon a hub cap plate.

These and other objects will be seen from the following specification and claims in conjunction with the appended drawing, in which:

Fig. 1 is a front elevational view of the present hub cap.

Fig. 2 is a section taken on line 2—2 of Fig. 1.

Fig. 3 is a front elevational view of a single spoke element; and

Fig. 4 is a section taken on line 4—4 of Fig. 3.

It will be understood that the above drawing illustrates merely a preferred embodiment of the invention, and that other embodiments are contemplated within the scope of the claims hereafter set forth.

The present wheel hub cap consists of an exteriorly convex and interiorly concave circular plate 11, the outer portion thereof being substantially tapered as at 12 and with the central portion 13 flat and lying in a plane at right angles to the central axis of said circular plate.

The tapered portions 12 of plate 11 terminate at its outer periphery in the reverse curved annular portion 14 with the peripheral flange 15, as shown in Fig. 2. Elements 16 represent conventional clips whereby the hub cap may be secured to the wheel.

Adjacent the periphery of plate 11, there are formed therethrough spaced pairs of circularly offset apertures in concentric circular arrangement defining inner and outer peripheral circles of apertures adapted to loosely yet retainingly receive the outer ends of the U-shaped spoke elements 19 in the manner hereafter described. The inner circle of spaced apertures is illustrated at 17, in Fig. 2, and the outer circle of alternately spaced apertures is designated at 18 in Fig. 2.

Plate 11 also has an additional circle of spaced apertures formed therethrough intermediate the outer periphery of said plate and its center adapted to receive the spoke securing bolts 24.

A plurality of spoke elements 19 are radially positioned upon the outer surface of plate 11, as shown in Figs. 1 and 2, and it will be apparent that one free end 21 of each spoke element is slidably nested within one of the outer apertures 18, and that the other spoke element 20 is slidably positioned at its outer end through an adjacent aperture 17 in the inner peripheral circle of apertures.

The apex 22 of each spoke element defines a semicircle opening 23 which cooperatively receives the securing bolt 24, there being a suitable washer 25 interposed between the bolt head and the adjacent spoke element apex 22.

As the apexes of adjacent pairs of spoke elements are overlapped with respect to each other, it is apparent from Figs. 1 and 2, that a single bolt 24 is effective to thereby secure an adjacent pair of spoke elements with respect to plate 11. Suitable washers 27 are applied to the bolt 24 upon the inner surface of plate 11, which cooperate with the nuts 26. Preferably, the washers 27 are lock washers.

As viewed in Fig. 1, it is apparent that the free end 21, for example, of one spoke element 19, slidably positioned through aperture 18, is circularly spaced and staggered from the free end 20 of an adjacent spoke element loosely positioned through a corresponding inner peripheral aperture 17.

Thus, the opposite end portions of adjacent spoke elements are arranged with respect to each other in staggered relation completely around the exterior surface of plate 11. However, the apexes of adjacent spoke elements are arranged in overlapped relation with respect to a single bolt 24.

The concave-convex cover 28 is centrally positioned over plate 11, so that its periphery overlies and covers the respective apexes 22 of said spoke elements and also covers up the securing bolts 24 to thereby produce a finished article.

Cover 28 is secured with respect to plate 11 by the centrally arranged transverse bolt 29 whose head 30 is suitably secured to cover 28 as by welding, brazing or by a spring clip, and whose shank extends through plate element 13 and is threadedly secured to bracket arm 31 on bracket 32.

Said bracket 32 is adapted to be secured over a wheel lug 33 by nut 34.

It is contemplated that the spokes may be enameled in any desired color, may be chrome plated, or may be made of stainless steel.

Having described my invention, reference should now be had to the claims which follow for determining the scope thereof.

I claim:

1. A wheel hub cap comprising a substantially concave-convex circular plate having formed therethrough intermediate its periphery and center a plurality of spaced circularly arranged apertures, and adjacent said periphery spaced pairs of circularly staggered apertures in concentric circular arrangement defining inner and outer peripheral circles of apertures, a plurality of U-shaped spoke elements radially positioned upon the outer surface of said plate with one free end of each spoke element loosely positioned through an outer peripheral aperture and with its other free end loosely positioned within an adjacent inner peripheral aperture, and a bolt retainingly extending through the overlapped apexes of an adjacent pair of spoke elements and through a corresponding aperture in the center series of apertures.

2. A wheel hub cap comprising a substantially concave-convex circular plate having formed therethrough intermediate its periphery and center a plurality of spaced circularly arranged apertures, and adjacent said periphery spaced pairs of circularly staggered apertures in concentric circular arrangement defining inner and outer peripheral circles of apertures, a plurality of U-shaped spoke elements radially positioned upon the outer surface of said plate with one free end of each spoke element loosely positioned through an outer peripheral aperture and with its other free end loosely positioned within an adjacent inner peripheral aperture, a bolt retainingly extending through the overlapped apexes of an adjacent pair of spoke elements and through a corresponding aperture in the center series of apertures, and a concave-convex cover centrally positioned over said plate and secured thereto with the periphery of said cover overlying the apexes and securing bolts of said spoke elements.

3. A wheel hub cap comprising a substantially concave-convex circular plate having formed therethrough intermediate its periphery and center a plurality of spaced circularly arranged apertures, and adjacent said periphery spaced pairs of circularly staggered apertures in concentric circular arrangement defining inner and outer peripheral circles of apertures, a plurality of U-shaped spoke elements radially positioned upon the outer surface of said plate with one free end of each spoke element loosely positioned through an outer peripheral aperture and with its other free end loosely positioned within an adjacent inner peripheral aperture, and a bolt retainingly extending through the overlapped apexes of an adjacent pair of spoke elements and through a corresponding aperture in the center series of apertures, the free end of one spoke element within an outer peripheral aperture being in circularly spaced relation with a free end of an adjacent spoke element within a corresponding inner peripheral aperture.

4. A wheel hub cap comprising a substantially concave-convex circular plate having formed therethrough intermediate its periphery and center a plurality of spaced circularly arranged apertures, and adjacent said periphery spaced pairs of circularly staggered apertures in concentric circular arrangement defining inner and outer peripheral circles of apertures, a plurality of U-shaped spoke elements radially positioned upon the outer surface of said plate with one free end of each spoke element loosely positioned through an outer peripheral aperture and with its other free end loosely positioned within an adjacent inner peripheral aperture, and a bolt retainingly extending through the overlapped apexes of an adjacent pair of spoke elements and through a corresponding aperture in the center series of apertures, the free end of one spoke element within an outer peripheral aperture being in circularly spaced relation with a free end of an adjacent spoke element within a corresponding inner peripheral aperture, and a concave-convex cover centrally positioned over said plate and secured thereto with the periphery of said cover overlying the apexes and securing bolts of said spoke elements.

5. A wheel hub cap comprising a substantially concave-convex circular plate having formed therethrough intermediate its periphery and center a plurality of spaced circularly arranged apertures, and adjacent said periphery spaced pairs of circularly staggered apertures in concentric circular arrangement defining inner and outer peripheral circles of apertures, a plurality of U-shaped spoke elements radially positioned upon the outer surface of said plate with one free end of each spoke element loosely positioned through an outer peripheral aperture and with its other free end loosely positioned within an adjacent inner peripheral aperture, a bolt retainingly extending through the overlapped apexes of an adjacent pair of spoke elements and through a corresponding aperture in the center series of apertures, and a washer on each bolt between the head thereof and an adjacent spoke element apex for anchoring an adjacent pair of spoke elements to said plate.

6. A wheel hub cap comprising a substantially concave-convex circular plate having formed therethrough intermediate its periphery and center a plurality of spaced circularly arranged apertures, and adjacent said periphery spaced pairs of circularly staggered apertures in concentric circular arrangement defining inner and outer peripheral circles of apertures, a plurality of U-shaped spoke elements radially positioned upon the outer surface of said plate with one free end of each spoke element loosely positioned through an outer peripheral aperture and with its other free end loosely positioned with an adjacent inner peripheral aperture, a bolt retainingly extending through the overlapped apexes of an adjacent pair of spoke elements and through a corresponding aperture in the center series of apertures, a concave-convex cover centrally positioned over said plate and secured thereto with the periphery of said cover overlying the apexes and securing bolts of said spoke elements, a bracket adapted to be secured at one end to a wheel lug and having a threaded aperture at its outer end, and a bolt centrally secured to said cover extending through said plate and threadedly through said bracket aperture.

References Cited in the file of this patent

UNITED STATES PATENTS

| | | |
|---|---|---|
| D. 168,977 | Ryerson | Mar. 3, 1953 |
| 779,877 | Schofield | Jan. 10, 1905 |
| 2,249,568 | Shinliver | July 15, 1941 |